Patented Sept. 22, 1953

2,653,171

UNITED STATES PATENT OFFICE 2,653,171

STABILIZED AROMATIC AMINES

Adrian L. Linch, Wilmington, Del., assignor to E. I. du Pont de Nemours & Company, Wilmington, Del., a corporation of Delaware No Drawing. Application February 28, 1950, Serial No. 146,933

8 Claims. (Cl. 260—578)

This invention relates to aromatic amines which have been stabilized against atmospheric oxidation, particularly by having incorporated therein small proportions of a new class of anti-oxidants therefor.

It has long been recognized that aromatic amines tend to become rapidly oxidized through contact with air which results in loss of the aromatic amines and decrease in their quality through contamination by the oxidation products. Aromatic amines, which have acquired a dark color from air exposure, are not suitable for the manufacture of azo dyes, pigments, basic colors, vat dyes, pharmaceuticals, rubber chemicals, etc. For example, xylidine will oxidize in 2 to 3 weeks under normal storage conditions to a point which renders it unsuitable for use in azo colors, and para-toluidine oxidizes to a deep red color in 2 to 3 days when stored in the liquid state at 60° C to 80° C. In practice, such oxidation has been largely avoided by consuming the amines within a few days of their production or the amines have been purified, by distillation or crystallization, just prior to their use. In some cases, the loss of unstabilized amine has been as high as 1% per week and the accumulated oxidation products have adversely affected the yield of substances prepared therefrom, such as azo dyes, by as much as 20%.

In industrial practice, the close scheduling of the production of the amines with the processes in which the amines are consumed has become increasingly less practical. The storage of amines, which require purification before use, is prohibitively costly because of the loss of amine by oxidation and the further losses incurred in the purification processes.

Attempts to stablize aromatic amines, by the use of conventional anti-oxidants employed for stabilizing other substances, have not been commercially successful because such anti-oxidants are inefficient or inoperative. In many cases, such conventional anti-oxidants produce negative results in the aromatic amines; that is, they act as pro-oxygenic catalysts. Also, most metal deactivating agents actually increase the susceptibility of the aromatic amines to attack by atmospheric oxygen.

It has been proposed to stabilize aromatic amines by adding carbon bisulfide thereto, which carbon bisulfide tends to liberate hydrogen sulfide. While carbon bisulfide and hydrogen sulfide are quite effective anti-oxidants for aromatic amines, they are gases which readily escape from the amines, are obnoxious and toxic and present explosion and corrosion hazards which greatly reduce their utility.

It has also been proposed to stabilize certain aromatic amines with aromatic mercaptans. However, such aromatic mercaptans are not particularly effective and, after a short period, invert to pro-oxygenic catalysts. Also, some of such aromatic mercaptans are inoperative with some amines and actually increase the susceptibility of such amines to atmospheric oxidation.

It is an object of my invention to provide a class of aromatic amines containing a new class of compounds which are effective to inhibit oxidation of the amines and which do not invert to pro-oxygenic catalysts. Another object is to provide a class of aromatic amines which are effectively stabilized against atmospheric oxidation, whereby loss of amine by oxidation is prevented, contamination of the amine by oxidation products is reduced and the deleterious effects of oxidized impurities in the amine are avoided. A further object is to provide a novel and improved method for stabilizing a specific class of aromatic amines. Further objects are to provide new compositions of matter and to advance the art. Still other objects will appear hereinafter.

The above and other objects may be accomplished in accordance with my invention which comprises incorporating in an aromatic amine of the formula R—$NH_2$, wherein R represents a substituted benzene ring in which the substituents consist of at least one number of the class consisting of methyl, chlorine, amino, phenylamino and aminotolyl groups, from about 0.01% to about 0.5% by weight of a zinc aromatic mercaptide of the formula R—S—Zn—S—R, wherein R represents a member of the class consisting of phenyl and substituted phenyl radicals in which the substituents are selected from chlorine, methyl, ethyl and carboxymethyl groups. Thereby, such aromatic amines are effectively stabilized against atmospheric oxidation.

I have found that such zinc aromatic mercaptides, or zinc salts of the aromatic mercaptans, are much more efficient anti-oxidants for such aromatic amines than are the aromatic mercaptans and do not tend to invert to pro-oxygenic catalysts. They effectively inhibit oxidation of such aromatic amines and prevent loss of the amine by oxidation, reduce contamination of the amine by oxidation products and avoid the synergistic action of the oxidation products in subsequent chemical processes in which the amines are employed. The resulting stabilized aromatic amines may be stored for relatively long periods of time, thereby obviating the necessity for close scheduling of the amine production with the process in which the amine is consumed and usually making costly purification processes unnecessary. Such zinc aromatic mercaptides are also effective to protect the amines in the processes by which they are manufactured so that higher yields of amine of better quality can be obtained.

The aromatic amines, which may be effectively stabilized by my zinc aromatic mercaptides, are those having the formula R—NH₂, wherein R represents a substituted benzene ring in which the substituents consist of at least one member of the class consisting of methyl, chlorine, amino, phenylamino and aminotolyl groups. Representative amines of this class are the toluidines, xylidines, 2-chloro-4-aminotoluene, 4-chloro-2-aminotoluene, toluylene diamines, phenylenediamines, amino-diphenylamines and tolidines.

The zinc aromatic mercaptides of my invention have the formula R'—S—Zn—S—R', wherein R' represents a member of the class consisting of phenyl and substituted phenyl radicals in which the substituents are selected from chlorine, methyl, ethyl and carboxymethyl groups. The term "phenyl" is employed in its restricted sense to denote the monovalent aromatic radical derived from benzene by the removal of 1 hydrogen atom. Particularly desirable and representative zinc aromatic mercaptides are:

Zinc phenyl mercaptide, Zn(—S—C₆H₅)₂
Zinc (2,5-dichloro phenyl) mercaptide

Zn(—S—C₆H₃Cl₂)₂

Zinc xylyl mercaptide

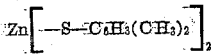

Zinc methyl benzoate-2-mercaptide

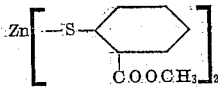

Zinc methyl benzoate-3-mercaptide

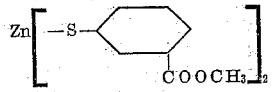

Except where otherwise indicated, the "xylyl mercaptan" employed in the examples is a mixture of isomeric mercaptans obtained by zinc reduction of the xylyl sulfonyl chlorides resulting from the treatment of commercial 3° xylene with chlorosulfonic acid. The 3° xylene is a commercial mixture of ortho, meta and para xylenes containing about 14% ortho xylene, about 55% meta xylene, about 22% para xylene, about 6.5% ethyl benzene and about 2% toluene. Also, except where otherwise indicated, the "zinc xylyl mercaptide" is the mixture of zinc salts prepared from "xylyl mercaptan." Such zinc xylyl mercaptide is the preferred anti-oxidant of my invention, particularly for stabilizing ortho toluidine.

The concentration of the zinc aromatic mercaptide in the amine should be from about 0.01% to about 0.5% by weight, preferably, from about 0.025% to about 0.3%, and usually about 0.1%. While the zinc aromatic mercaptides may be effective in concentrations above 0.5%, such higher concentrations will generally be objectionable as they would contaminate the amine to an undesirable extent. Also, concentrations below 0.01% of zinc aromatic mercaptide will usually show some effect, but such effect will generally be insufficient for practical purposes.

Not all of the zinc aromatic mercaptides of my invention are equally effective for all of the aromatic amines of my invention. Accordingly, the particular zinc aromatic mercaptide and the concentration employed for each of the aromatic amines will be chosen in accord with the degree of stability desired. Also, the choice of zinc aromatic mercaptide and the concentration thereof will be governed by the conditions to which the aromatic amine will be exposed, such as light, temperature and atmospheric contact. Light acts as a catalyst for the oxidation of the aromatic amines and hence, if the amine is to be exposed to light for any substantial period of time, it will be necessary to materially increase the concentration of the zinc aromatic mercaptide. Furthermore, the rate of oxidation of the aromatic amine increases with increase in temperature, so that the concentration of zinc aromatic mercaptide should be increased when the amine is to be subjected to temperatures above atmospheric. Furthermore, the rate of oxidation of the aromtic amine varies with variation in the extent of its exposure to air or oxygen and higher concentrations of zinc aromatic mercaptide will be required when the amine is to be exposed to air to any material extent. Therefore, it will be understood that the zinc aromatic mercaptides exhibit their maximum efficiency under storage conditions which involve room temperature or lower temperatures, exclude light, and provide a minimum contact with air or oxygen, as in closed metal tanks and drums.

In order to obtain optimum stability of the amine, I generally prefer to add the zinc aromatic mercaptide to the aromatic amine as soon as the amine is prepared, particularly, immediately after distillation or during crystallization of the amine. If the amine is distilled, minimum contact thereof with oxygen and maximum stabilization are obtained if the amine is distilled into a receiver containing the zinc aromatic mercaptide. However, the application of my invention is not restricted to freshly prepared amines, as the zinc aromatic mercaptide may be added to an aromatic amine which has been partially oxidized, and the zinc aromatic mercaptide will effectively retard further oxidation of the amine. Also, the aromatic mercaptides may be added during the manufacture of the amine to avoid atmospheric oxidation during such manufacture, to thereby obtain the amine in higher yields and better quality. In particular, the zinc aromatic mercaptide may be added to the crude amine, before purification of the amine by crystallization, to thereby inhibit oxidation of the amine during the drying operation.

If the aromatic amine is liquid at normal temperatures, the zinc aromatic mercaptide may be simply added thereto in the desired concentration and dissolved therein. If the amine is a solid at atmospheric temperatures, it may be melted or dissolved in an inert solvent and the zinc aromatic mercaptide added to the melted amine or to the solution. Also, if the zinc aromatic mercaptide does not dissolve in a particular aromatic amine at a sufficiently rapid rate, it may be added as a solution in a suitable solvent, such as a mixture of isopropyl alcohol and xylene. The zinc aromatic mercaptides effectively stabilize the aromatic amines in the presence of inert solvents and diluents.

Examples are given hereinafter, illustrating the effect of representative zinc aromatic mercaptides in stabilizing representative aromatic amines, some of such examples including tests on free aromatic mercaptans for purposes of comparison. The tests with liquid aromatic amines were carried out in clear glass bottles filled to approximately 75% of their capacity with the amine or stabilized amine and exposed to diffused daylight at room temperature. The bottles were capped but not sealed air-tight. In the absence of practical specific analytical methods for direct determination of the concentration of oxidation products in the preliminary stages, the rate of formation of visible color was adopted as the basis for the determination of anti-oxidant activity. The development of color follows an orderly sequence which is related to the extent of oxidation. In nearly every case, the first visible indication of oxidation is produced by derivatives which impart a yellow color to the system, followed by further oxidation to red compounds. Final stages of oxidative decomposition were evidenced by the appearance of green and blue components. Although the oxidation follows a complex series of reactions, and the constitutions of many of the intermediate products are unknown, the autocatalytic nature of the system can be easily demonstrated.

Evaluation of anti-oxidants, which are effective inhibitors for atmospheric oxidation of the aromatic amines, has disclosed a certain amount of specificity in the chain of reactions. Whereas certain inhibitors suppress the initial oxidation to yellow derivatives, the oxidation rate of these yellow components, which do form, to the red stage is only slightly reduced. Other inhibitors are only partially effective in suppressing the production of the initial yellow derivatives, but effectively prevent oxidation to red products. Similar results have been observed in the red to blue-green development stages. Therefore, in order to establish a common basis for quantitative evaluation of anti-oxidant efficiency, the rate of formation of each of these three color classes, as well as total visible color formation, was evaluated as optical density determined in a Cenco-Sheard-Sanford Photelometer, using blue (central maximum=410 mu), green (525 mu) and red (610 mu) filters, as well as total absorption with no filter. Distilled water was used as the reference standard, and the density expressed as percent transmission. Experience has shown that the use of aromatic amines, darker than a red-amber color, in chemical processes does not produce satisfactory results. Therefore, when oxidation has progressed to an extent sufficient to reduce the total light transmission below 75%, blue transmission below 20%, green below 60% and red below 95%, the amine is considered to be unsuitable for use without purification. The sum of the number of days required to reach each of these four values is designated as the index. The anti-oxidant index is obtained by subtracting the index of the unstabilized control sample from the index of the stabilized material. This method minimizes variations in oxidation susceptibility exhibited by individual production lots of the amine.

Evaluation of those amines, which are normally solid at room temperature, was carried out somewhat differently. The inhibitor was dissolved in the amine at a temperature sufficiently high to maintain a liquid state. The test was then conducted at that temperature, or the solution was permitted to freeze and the test continued at normal temperature. Since light density measurements were not practical, the progress of the oxidation was estimated visually. The amine was considered unsuitable for use when the color change had progressed to a dark red, dark brown, or dark lavender shade. Since a control sample, containing no inhibitor, was tested at the same time, personal variations in judgment of color depth largely cancelled out. In order to place these evaluations on the same index basis adopted for liquid amines, the number of days elapsed to the end point was multiplied by four. In several cases, the crystallizing point was used as the criterion of anti-oxidant efficiency.

In order to further show the effectiveness of the anti-oxidants of my invention, the ratio of the stability of the stabilized amine to the stability of the unstabilized amine was calculated by dividing the index of the stabilized amine by the index of the unstabilized amine (control index). This ratio is given in the examples as the "stability ratio." This stability ratio expresses the relation of the storage life of the stabilized amine to the storage life of the unstabilized amine under the same conditions. For example, a stability ratio of 2 indicates that the stabilized amine requires twice as long as the unstabilized amine to reach the final stage of oxidative decomposition and be considered to be unsuitable for most uses; that is, the stabilized amine has a storage life 2 times that of the unstabilized amine.

EXAMPLE I

*Ortho Toluidine*

The amine to be stabilized was a commercial grade of ortho toluidine which distilled from 5 cc. to 95 cc. over a range of 1.0° C. including 200.2° C., contained not less than 99.0% total toluidine by diazotization, and was completely soluble in 10% hydrochloric acid. The ortho toluidine was re-distilled at 20 mm. pressure to separate it from colored, non-volatile impurities and to obtain a colorless product. The following table summarizes the results obtained from stability tests made at room temperature.

[Control index (unstabilized o-toluidine)=210.]

| Anti-Oxidant | Concentration, Percent | Anti-oxidant Index | Stability Ratio |
|---|---|---|---|
| 1. Zinc phenyl mercaptide | 0.1 | 320 | 2.5 |
| 2. Zinc (2,5-dichloro phenyl) mercaptide | 0.1 | 710 | 4.4 |
| 3. Zinc xylyl mercaptide | 0.5 | 490 | 3.3 |
| 4. Zinc methyl benzoate-2-mercaptide | 0.1 | 585 | 3.8 |
|  | 0.05 | 285 | 2.4 |
|  | 0.01 | 100 | 1.48 |
| 5. Zinc methyl benzoate-3-mercaptide | 0.1 | 510 | 3.5 |
| 6. Zinc (2,4-dimethyl phenyl) mercaptide | 0.1 | 292 | 2.4 |
| 7. Thiophenol | 0.1 | 96 | 1.46 |
| 8. Thio-beta-naphthol | 0.1 | −10 | 0.95 |
| 9. Xylyl mercaptan | 0.1 | 120 | 1.57 |
| 10. Thiosalicylic acid | 0.5 | −70 | 0.67 |
| 11. 2-Mercapto-methyl benzoate | 0.5 | 23 | 1.11 |

Tests 7 to 11 are included for purposes of comparison.

Eight hundred pounds of ortho toluidine in which 0.2 lb. of zinc xylyl mercaptide was dissolved was stored in a steel drum for eleven months and the color density determined.

| Filter | Percent Initial Transmission [1] | | Percent Final Transmission | |
|---|---|---|---|---|
| | Control | Stabilizer | Control | Stabilizer |
| Blue | 57.0 | 68.5 | 5.5 | 52.0 |
| Green | 87.5 | 96.0 | 12.0 | 88.5 |
| Red | 96.5 | 99.0 | 70.0 | 96.0 |
| None | 89.0 | 95.5 | 36.0 | 88.5 |

[1] Determined 24 hours after distillation.

EXAMPLE II

Para toluidine

Commercial quality para toluidine, which had a freezing point above 43.0° C. and was completely soluble in 10% HCl, was distilled under reduced pressure to obtain a water white product. The tests for oxidation rate were carried out in open bottles in an air oven at 70° C. ±2° C. to simulate industrial plant storage conditions. The extent of decomposition was estimated by visual examination.

[Control index (unstabilized para toluidine) = 8 (48 hours).]

| Anti-Oxidant | Concentration, Percent | Anti-Oxidant Index | Stability Ratio |
|---|---|---|---|
| 1. Zinc xylyl mercaptide | 0.05 | 24 | 4. |
| | 0.20 | 44 | 6.5 |
| 2. Zinc methyl benzoate-2-mercaptide | 0.25 | 28 | 4.5 |
| 3. Zinc (2,5-dichloro phenyl) mercaptide | 0.10 | 28 | 4.5 |

EXAMPLE III

Xylidines

The amine to be stabilized was a mixture of isomeric xylidines, obtained by reduction of nitro xylene isomers produced by nitration of 3° xylene, which contained more than 99.0% total amines calculated as xylidine, no material insoluble in 10% HCl, less than 0.15% nitro xylene as determined by titanous sulfate reduction, and distilled over the range 214.0° C. (first drop) to 223.0° C. (95% point) at 760 mm. This mixture was distilled under reduced pressure to obtain a water white product for the evaluation of anti-oxidants. The following table summarizes the results obtained from stability tests made in clear glass in daylight room temperature.

[Control index (unstabilized xylidine) = 70.]

| Anti-Oxidant | Concentration, Percent | Anti-Oxidant Index | Stability Ratio |
|---|---|---|---|
| 1. Zinc xylyl mercaptide | 0.2 | 290 | 5.1 |
| 2. Zinc methyl benzoate-2-mercaptide | 0.1 | 250 | 4.6 |
| 3. 2-Mercapto-methyl benzoate | 0.1 | 33 | 1.47 |
| 4. 3-Mercapto-methyl benzoate | 0.1 | 0 | 1.0 |

EXAMPLE IV

2-chloro-4-amino toluene

The commercial product crystallized at 21.2° C., had a nitrite absorption value above 96.0%, and contained more than 24.0% chlorine. It was distilled at 10 mm. pressure to obtain a water white 2-chloro-4-amino toluene for evaluation of response to anti-oxidants. The following table summarizes the results obtained from the tests:

[Control index (unstabilized amine) = 90.]

| Anti-Oxidant | Concentration, Percent | Anti-Oxidant Index | Stability Ratio |
|---|---|---|---|
| 1. Zinc xylyl mercaptide | 0.5 | 1,300 | 15.5 |
| | 0.1 | 570 | 7.4 |
| | 0.02 | 520 | 6.8 |
| 2. Zinc methyl benzoate-2-mercaptide | 0.1 | 870 | 10.7 |
| 3. Xylyl mercaptan | 0.5 | −60 | 0.33 |
| 4. Thiosalicylic acid | 0.5 | −80 | 0.11 |
| 5. 2-Mercapto-methyl benzoate | 0.1 | 0 | 1.0 |

By excluding the catalytic effects of daylight, the effectiveness of these anti-oxidants is increased considerably. Three hundred pound lots of freshly distilled 2-chloro-4-amino toluene were loaded into each of two 55 gallon steel drums. To one was added 0.075 lb. of zinc xylyl mercaptide and thoroughly mixed. These drums were stored under normal, unheated warehouse conditions. The color density of the protected amine (expressed as per cent transmission) increased very slowly, but considerable decomposition to dark colored derivatives took place in the unstabilized control lot, over a 360 day storage period.

| Filter | Initial Tranmission [1] | | Final Transmission | |
|---|---|---|---|---|
| | Control | Stabilized | Control | Stabilized |
| Blue | 42.0 | 51.0 | 4.0 | 20.0 |
| Green | 78.5 | 84.5 | 21.0 | 54.0 |
| Red | 95.5 | 96.0 | 62.0 | 83.0 |
| None | 83.0 | 86.5 | 37.0 | 64.0 |

[1] 48 hours after distillation.

EXAMPLE V

4-chloro-2-amino toluene

A commercial grade product, containing more than 98% 4-chloro-2-amino toluene, was distilled at 20 mm. pressure to remove colored impurities. The following table summarizes the results collected from stability tests made at room temperature in daylight exposure.

[Control index (unstabilized aliquot) = 250.]

| Anti-Oxidant | Concentration, Percent | Anti-Oxidant Index | Stability Ratio |
|---|---|---|---|
| 1. Zinc xylyl mercaptide | 0.1 | 820 | 4.3 |
| 2. Zinc methyl benzoate-2-mercaptide | 0.1 | 760 | 4.0 |

EXAMPLE VI

Toluylene diamine (2,4-diamino toluene)

A sample of toluylene diamine, which had a melting range 97.4–96.8° C., was distilled at 2–3 mm. pressure and 141–142° C. vapor temperature to obtain a colorless product for anti-oxidant evaluation. The anti-oxidant was dissolved in the molten amine at 98°–100° C., and the sample allowed to solidify in a clear glass bottle. The storage tests were conducted at normal laboratory room temperature in diffused daylight. Not only was color used as a criterion of oxidation progress, but the appearance of a black tar was considered as the useful limit of anti-oxidant life.

[Control index=4.]

| Anti-Oxidant | Concentration, Percent | Anti-Oxidant Index | Stability Ratio |
|---|---|---|---|
| 1. Zinc methyl benzoate-2-mercaptide | 0.3 | 680 | 171 |
| 2. Zinc xylyl mercaptide | 0.25 | 132 | 34 |

Similar results may be obtained by the addition of anti-oxidants selected from this class of zinc mercaptides to other freshly purified phenylene diamines such as meta phenylene diamine. For example, freshly distilled, commercial meta phenylene diamine which crystallized at 62.85° C. was protected from atmospheric oxidation at 70°±2° C. for periods as follows:

[Control index=4.]

| Anti-Oxidant | Concentration, Percent | Anti-Oxidant Index | Stability Ratio |
|---|---|---|---|
| 1. Zinc xylyl mercaptide | 0.2 | 8 | 3 |
| 2. Zinc methyl benzoate-2-mercaptide | 0.1 | 8 | 3 |

EXAMPLE VII

*4-amino diphenylamine*

A sample of distilled para amino diphenylamine was taken from a plant still product receiver, and kept molten until aliquots could be removed for testing the activity of anti-oxidants. Although a blue-violet color had developed during the short exposure (less than an hour), the results of the evaluation were distinct. The crystallizing point of the initial sample was 69.8° C. The aliquots, after thorough mixing at 80-85°, were allowed to crystallize and the evaluation made at room temperature. The control (no inhibitor) froze to a pale pink solid, but, during a 24 hour storage period of exposure to light and air, developed a dark red-lavender color, and the formation of a black tar, which wetted the sides of the sample bottle, was quite noticeable. In the presence of inhibitors, the suppression of oxidative decomposition to a similar end point is evaluated in terms of anti-oxidant index as follows:

[Control index=4.]

| Anti-Oxidant | Concentration, Percent | Anti-Oxidant Index | Stability Ratio |
|---|---|---|---|
| 1. Zinc xylyl mercaptide | 0.1 | 420 | 106.0 |
| 2. Zinc methyl benzoate-2-mercaptide | 0.1 | 28 | 8.0 |

EXAMPLE VIII

*Tolidine (3,3' dimethyl 4,4' diamino diphenyl)*

About 0.1% of zinc xylyl mercaptide was dissolved in an aliquot of an inversion mixture of tolidine, isopropyl alcohol, ortho toluidine, palladium hydrogenation catalyst, and isomeric by-products obtained from the inversion of crude ortho hydrazo toluene with hydrochloric acid followed by alkalifying with sodium hydroxide. The aliquots were allowed to stand at room temperature in clear glass bottles exposed to diffused daylight for five days, then heated at 75°-80° C. for six days. The tolidine was recovered by filtration, and washed with toluene and water to remove impurities. The tolidine, from the unstabilized aliquot, had a melting point of 125.6° C., while that, from the stabilized aliquot, had a melting point of 126.2° C. The stabilized samples were much lighter in color, and the higher melting points confirmed lower concentration of oxidation products.

It will be understood that the preceding examples are given solely for illustrative purposes and that I do not intend to limit my invention to the specific embodiments disclosed therein. It will be apparent to those skilled in the art that other aromatic amines, within the class heretofore disclosed, may be similarly stabilized. It will also be apparent that other zinc aromatic mercaptides, within the class hereinbefore defined, may be substituted for those of the examples. It will be further apparent that the concentration of zinc aromatic mercaptide in the aromatic amine may also be varied within the limits disclosed. Still further, the stabilized amine may be diluted with inert solvents or with inert liquid or solid diluents.

It will be apparent that by my invention, I am able to provide a class of aromatic amines which are effectively stabilized against oxidation for relatively long periods of time. Thereby, the amines may be stored without material loss in amine or contamination of the amine with deleterious oxidation products and it is unnecessary to schedule the production of the aromatic amines so that they are consumed as rapidly as they are produced. Also, the losses, entailed in purification of oxidized amine, are eliminated or greatly reduced. Accordingly, it is apparent that my invention constitutes a valuable advance in and contribution to the art.

I claim:

1. A composition consisting essentially of an aromatic amine of the formula R—NH$_2$ wherein R represents a substituted benzene ring in which the substituents consist of at least one member of the class consisting of methyl, chlorine, amino, phenylamino and aminotolyl groups, and from about 0.01% to about 0.5% of a zinc aromatic mercaptide of the formula R'—S—Zn—S—R' wherein R' represents a member of the class consisting of phenyl and substituted phenyl radicals in which the substituents are selected from the class consisting of chlorine, methyl, ethyl and carboxymethyl groups.

2. A composition consisting essentially of an aromatic amine of the formula R—NH$_2$ wherein R represents a substituted benzene ring in which the substituents consist of at least one member of the class consisting of methyl, chlorine, amino, phenylamino and aminotolyl groups, and from about 0.01% to about 0.5% of zinc xylyl mercaptide.

3. A composition consisting essentially of an aromatic amine of the formula R—NH$_2$ wherein R represents a substituted benzene ring in which the substituents consist of at least one member of the class consisting of methyl, chlorine, amino, phenylamino and aminotolyl groups, and from about 0.01% to about 0.5% of zinc methyl benzoate-2-mercaptide.

4. A composition consisting essentially of a toluidine and from about 0.01% to about 0.5% of a zinc aromatic mercaptide of the formula R'—S—Zn—S—R' wherein R' represents a member of the class consisting of phenyl and substituted phenyl radicals in which the substituents are selected from the class consisting of chlorine, methyl, ethyl and carboxy-methyl groups.

5. A composition consisting essentially of ortho-toluidine and from about 0.01% to about 0.5% of a zinc aromatic mercaptide of the formula R'—S—Zn—S—R' wherein R' represents a member of the class consisting of phenyl and substituted phenyl radicals in which the substituents are selected from the class consisting of chlorine, methyl, ethyl and carboxymethyl groups.

6. A composition consisting essentially of ortho-toluidine and from about 0.01% to about 0.5% of zinc xylyl mercaptide.

7. A composition consisting essentially of a chloro-aminotoluene and from about 0.01% to about 0.5% of a zinc aromatic marcaptide of the formula R'—S—Zn—S—R' wherein R' represents a member of the class consisting of phenyl and substituted phenyl radicals in which the substituents are selected from the class consisting of chlorine, methyl, ethyl and carboxymethyl groups.

8. A composition consisting essentially of a chloro-aminotoluene and from about 0.01% to about 0.5% of zinc xylyl mercaptide.

ADRIAN L. LINCH.

References Cited in the file of this patent

UNITED STATES PATENTS

| Number | Name | Date |
|---|---|---|
| 2,310,449 | Lightbown et al. | Feb. 9, 1943 |
| 2,422,484 | Herbst | June 17, 1947 |